(12) United States Patent
Shkondin

(10) Patent No.: US 7,285,889 B2
(45) Date of Patent: Oct. 23, 2007

(54) PULSED-INERTIAL ELECTRIC MOTOR

(75) Inventor: Vasily Vasilievich Shkondin, Moscow (RU)

(73) Assignee: Ultra Motor Company Limited, Liverpool (GB)

(*) Notice: Subject to any disclaimer, the term of this patent is extended or adjusted under 35 U.S.C. 154(b) by 192 days.

(21) Appl. No.: 11/249,054

(22) Filed: Oct. 11, 2005

(65) Prior Publication Data

US 2006/0232154 A1 Oct. 19, 2006

Related U.S. Application Data

(63) Continuation-in-part of application No. 10/824,205, filed on Apr. 14, 2004, now Pat. No. 6,975,054, which is a continuation of application No. PCT/RU03/00178, filed on Apr. 18, 2003.

(60) Provisional application No. 60/512,652, filed on Oct. 20, 2003.

(30) Foreign Application Priority Data

Apr. 11, 2005 (RU) .............................. 2005110334

(51) Int. Cl.
*H02K 13/04* (2006.01)
*H02K 23/04* (2006.01)
*H02K 21/26* (2006.01)
*B60K 7/00* (2006.01)

(52) U.S. Cl. ................ 310/148; 310/67 R; 310/127; 310/151; 310/154.01; 310/177; 310/195

(58) Field of Classification Search ........ 310/127–131, 310/154.01, 180, 219, 148, 195, 253, 151, 310/134, 136, 67 R, 197–198, 203–205

See application file for complete search history.

(56) References Cited

U.S. PATENT DOCUMENTS 4,190,779 A 2/1980 Schaeffer (Continued)

FOREIGN PATENT DOCUMENTS

CA 2072759 1/1992

(Continued)

*Primary Examiner*—Burton Mullins
(74) *Attorney, Agent, or Firm*—Garvey, Smith, Nehrbass & North, L.L.C.; Seth M. Nehrbass; Brett A. North

(57) ABSTRACT

The invention relates to electric motors, particularly to low-voltage gearless commutator motors, and can be used as motor-wheels in transportation vehicles and in other technologies. The aim of the present invention is to provide an electric motor with increased performance characteristics, relatively simple design, and high reliability. A pulsed inertial electric motor according to the invention comprises: (i) a stator with circular magnetic conductor on which an even number of permanent magnets are uniformly arranged with a certain pitch; (ii) a rotor separated from the stator by air gap and bearing an even number of electromagnets, each electromagnet consisting of two coils with opposite winding directions connected in series, which are arranged over the circle in pairs one opposite to another; (iii) a collector distributor mounted on the stator body, containing circularly arranged current-conducting plates separated by insulating spacers and connected with alternating polarity to a dc current source, and (iv) current collectors-brushes mounted on the rotor and capable of contacting with plates of the collector distributor, whereby all brushes are connected to identical (beginning or end) terminals of the windings of said electromagnets and interconnected so that the coils in the opposite electromagnets are connected to each other via one identical terminal and to the opposite brushes via another identical terminal, with the number n of permanent magnets in the stator and the number m of electromagnets in the rotor selected so as to obey the relations $n=10+4k$, $m=4+2l$, where k is an arbitrary integer ($k=0, 1, 2, \ldots$) and l is any integer such that $0 \leq l \leq k$.

13 Claims, 4 Drawing Sheets

U.S. PATENT DOCUMENTS

| | | |
|---|---|---|
| 5,164,623 A | 11/1992 | Shkondin |
| 6,355,996 B1 | 3/2002 | Birkestrand |
| 6,384,496 B1 | 5/2002 | Pyntikov et al. |
| 6,492,756 B1 | 12/2002 | Maslov et al. |
| 6,617,746 B1 | 9/2003 | Maslov et al. |
| 6,727,668 B1 | 4/2004 | Maslov et al. |
| 6,791,226 B1 | 9/2004 | Dhawan |

FOREIGN PATENT DOCUMENTS

| | | |
|---|---|---|
| EP | 463 168 * | 1/1992 |
| EP | 0507967 | 5/1992 |
| GB | 2149226 | 6/1985 |
| RU | 2035115 | 5/1995 |
| RU | 2038985 | 7/1995 |
| RU | 2129965 | 5/1999 |
| RU | 2172261 | 8/2001 |
| SU | 628008 | 10/1978 |
| SU | 910480 | 3/1982 |
| SU | 1725780 | 4/1992 |
| WO | WO 93/08999 | 5/1993 |

\* cited by examiner

PULSED-INERTIAL ELECTRIC MOTOR

CROSS-REFERENCE TO RELATED APPLICATIONS

This is a continuation-in-part of my U.S. patent application Ser. No. 10/824,205, filed 14 Apr. 2004, now U.S. Pat. No. 6,975,054 and incorporated herein by reference, which is a continuation of International Application No. PCT/RU2003/00178, filed 18 Apr. 2003, priority of which is hereby claimed, and which is incorporated herein by reference.

Priority of my Russian Patent Application No. 2005110334 filed 11 Apr. 2005, and incorporated herein by reference, is hereby claimed.

U.S. Patent Publication No. US 2004/0239204 A1 is incorporated herein by reference.

Priority of my U.S. Provisional Patent Application No. 60/512,652, filed 20 Oct. 2003, and incorporated herein by reference, is hereby claimed.

Incorporated herein by reference is my International Application No. PCT/RU2003/00178, filed 18 Apr. 2003, and its publication, No. WO 2004/091957, published on 28 Oct. 2004.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The invention relates to electric motors, particularly to low-voltage gearless commutator motors, and can be used as motor-wheels in vehicles such as electrically propelled bicycles, scooters, motorcycles, electric-motor cars, etc., as well as in other technologies.

2. Background of the Invention

Devices and machines provided with a reduction gear and an asynchronous electric motor are widely used in various technologies, in particular, in transportation. Asynchronous motors, being ecologically safe, reliable, and economically effective, offer a number of advantages over internal combustion engines.

The best prospects are related to a gearless (direct-drive) motor-in-wheel (motor-wheel) in which the wheel rotation is induced directly by the electromagnetic interaction between the built-in rotor and stator magnetic systems. In prior art, there is a motor-wheel comprising a rim and a shaft with built-in asynchronous electric motor. The motor represents a disk asynchronous electric machine comprising a stator with magnetic conductor, windings, and current lead, which is mounted on the immobile axis, and a rotor with short-circuit winding and magnetic conductors situated on both sides of the stator. The stator and rotor in assembly comprise a wheel capable of spinning. This motor-wheel design provides high reliability due to the absence of a mechanical reduction gear and is characterized by better cooling conditions as compared to the traditional design, which is ensured by radial channels carrying a cooling medium. However, use of the asynchronous electric motor still leads to high heat evolution and requires a complicated control system and high-voltage power supply. Such a motor-wheel offers no prospects in electric energy recuperation during motion of retardation of the vehicle.

Another built-in motor known in the prior art comprises two main parts: an immobile stator, mounted on the axis and provided with a magnetic conductor and a set of uniformly arranged permanent magnets, and a mobile rotor bearing a rim and containing at least two groups of electromagnets. A collector distributor (commutator) is mounted on the stator and provided with current-conducting plates connected to a dc current source. The rotor bears current collectors occurring in electric contact with plates of the collector distributor.

Said motor-wheel can be implemented in several modifications and variants. Advantages of such design are the absence of a reducing gear, use of low-voltage power sources, absence of supplementary electronic circuits, possibility of energy recuperation, and small size and weight. By combining the main elements of this motor-wheel with auxiliary elements, it is possible to create a variety of analogous devices retaining all advantages of said motor-wheel.

However, the above motor-wheel and its analogs still have some disadvantages, the main of these being large start and transient currents in course of starting and accelerating the vehicle. This leads to rapid degradation and a decrease in the working life of storage batteries and to unfavorable thermal regimes. Another drawback is low efficiency of recovery and use of electric energy. Finally, said electric motors are characterized by relatively low torque, which considerable reduces the field of possible practical applications. Technical solutions suggested to eliminate these disadvantages are based on the use of high-voltage power sources and complicated control schemes, which increase the cost and decrease reliability of such systems in exploitation.

SUMMARY OF THE INVENTION

The aim of the present invention is to provide an electric motor with increased performance characteristics, relatively simple design, and high reliability.

A pulsed inertial electric motor according to the present invention comprises (i) a stator with circular magnetic conductor on which an even number of permanent magnets are uniformly arranged with a certain pitch, (ii) a rotor separated from the stator by air gap and bearing an even number of electromagnets arranged in pairs one opposite to another, (iii) a collector distributor (commutator) mounted on the stator body, containing current-conducting plates separated by insulating spacers and connected with alternating polarity to a dc current source, and (iv) current collectors (brushes) mounted on the rotor and capable of contacting with plates of the collector distributor. The brushes are connected to identical terminals of the windings of said electromagnets.

Each electromagnet consists of two coils with opposite winding directions, which are connected in series. The coils of adjacent electromagnets are connected in series. The coils in the opposite electromagnets are connected to each other via one identical terminal and to the opposite brushes via another identical terminal.

The number (n) of permanent magnets in the stator and the number (m) of electromagnets in the rotor are selected so as to obey the relations $$n=10+4k,$$

where k is an arbitrary integer (k=0, 1, 2, . . . ), and $$m=4+2l,$$

where l is any integer such that $0 \leq l \leq k$. The numbers of permanent magnets and electromagnets are most frequently selected as follows: n=10, m=4; n=14, m=6; n=18, m=4; n=22, m=4, 6, 8, 10; n=26, m=4, 6, 8, 10, 12, and so on. For the proposed arrangement of magnets and the adopted scheme of commutation, these relations provide for a resonance of currents in the coils of opposite electromagnets, which decreases the voltage jumps in the start-up and acceleration regimes and improves dynamic characteristics of the motor. In addition, this scheme ensures a maximum recuperation of electric energy due to the counter-emf development in the free-run regime.

In one preferred embodiment, the coils of the opposite electromagnets connected to the brushes are shunted by capacitors so as to form resonance circuits. This additionally improves dynamic characteristics of the motor and practically eliminates sparking at the collector brushes. The capacitance of such shunting capacitors is increased in proportion to the number of turns in the coils of electromagnets. It is also desired that all resonance circuits formed by these capacitors and coils would have the same resonance frequency.

Sparking at the collector brushes can be also eliminated by selecting an appropriate phase lead in the contact between brushes and current-conducting collector plates. In order to provide for this, the brushes are usually mounted so as to make possible a control of their positions relative to the plates. The optimum phase lead falls within 0-8°. The total number of turns in coils of the opposite electromagnets may be different. The resonance phenomena are increased provided that this difference amounts to $\frac{1}{2^p}$ of the total number of turns in one of the coils, where p=2, 3, 4, . . . . The present invention can be implemented in both unidirectional and reversible variants, depending on the regime of electric power supply. In the former case, the positive current-carrying plates of the collector distributor are connected to the positive electrode of the dc current source, while the negative current-carrying plates are shorted to the motor frame. In the reversible motor, the positive plates of the collector distributor are also connected to the positive electrode of the power supply source, but the negative plates are connected to the negative electrode of the dc current source and isolated from the motor case. In order to change the direction of rotation, it is necessary to switch the mode of collector plate connection to the power supply electrodes.

The motor according to the present invention can be implemented so that the rotor is arranged either outside or inside the stator.

BRIEF DESCRIPTION OF THE DRAWINGS

The essence of the present invention is illustrated by the following figures. For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
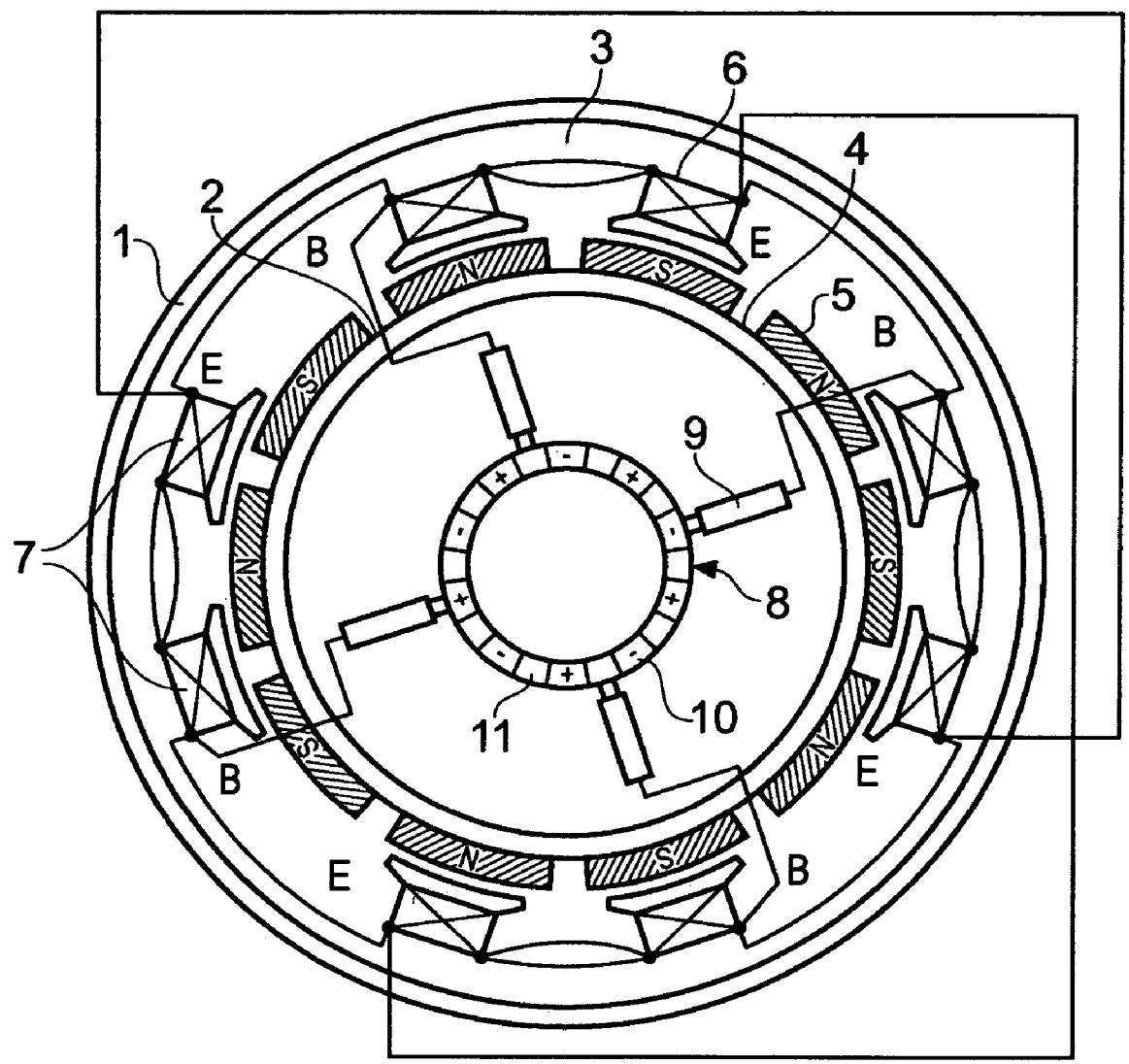
FIG. 1 gives schematic diagram of a motor according to the present invention, in which the stator is arranged inside the rotor.

FIG. 1 shows schematic diagram of a pulsed inertial motor according to the present invention, which can be used as motor-wheel in various vehicles, for example, in electrically propelled bicycles. The electric motor has a frame (1), which also plays the role of a protective shell and transfers rotation to the wheel. The frame is connected by spokes to a rim (not depicted in the figure). The main parts of the motor are stator (2) arranged inside rotor (3). The stator has a circular magnetic conductor (4) bearing an even number of permanent magnets (5) arranged at equal pitch and alternating polarity (in this particular case, there are ten permanent magnets). Rotor (3) is separated from stator (2) by air gap and bears an even number (in this particular case, four) of electromagnets (6) arranged in pairs one opposite to another (two pairs). Each electromagnet consists of two coils (7) with opposite winding directions (clockwise against anti-clockwise), which are connected in series, so that the end (denoted by "E" in FIG. 1) of the second coil in each electromagnet is connected to the beginning (denoted by "B" in FIG. 1) of the first coil of the adjacent electromagnet.

In the course of operation, the coils (7) of electromagnets (6) are power supplied from a dc current source (not depicted in FIG. 1) via a collector distributor (8) and brushes (9). The collector distributor (commutator) is mounted on the stator body, while the brushes (9) are mounted on the rotor, move with the rotor relative to the current-carrying plates of the collector distributor plates (10), and are capable of contacting with these plates. The collector distributor plates (10) are separated by insulating gaps (11) and connected in series with alternating polarity to the dc current source. The number of the collector distributor plates (in the given case, ten) is equal to the number of permanent magnets in the stator.

All brushes (9) are connected to identical terminals of electromagnets (6). In FIG. 1, each brush is connected to the beginning (B) of the first coil of the corresponding electromagnet (it is also possible to connect brushes to the ends (E) of the second coils; in which case the motor will rotate in the opposite direction).

The coils of adjacent electromagnets (6) are connected to each other in series, whereby the end (E) of one electromagnet is connected to the beginning (B) of the adjacent electromagnet, and the terminals not connected to brushes are connected to identical terminals of the opposite coil.

The number (n) of permanent magnets in the stator (in FIG. 1, n=10) and the number (m) of electromagnets in the rotor (in FIG. 1, m=4) are selected so as to obey the relations $$n=10+4k,$$

$$m=4+2l,$$

where k is an arbitrary integer (k=0, 1, 2, . . . ) and l is any integer such that $0 \leq l \leq k$ (in FIG. 1, k=l=0).

The principle of operation of the electric motor according to the present invention is analogous to that of the traditional dc motor and is based on the electromagnetic forces of mutual attraction and repulsion arising during the interaction of electromagnets (6) of the rotor with permanent magnets (5) of the stator. When an electromagnet occurs in a position with its axis situated between the axes of two neighboring permanent magnets, the coils of this electromagnet are powered so that the resulting magnetic pole is opposite to the pole of the subsequent permanent magnet and coincides with that of the previous permanent magnet. Thus, the given electromagnet is simultaneously subjected to repulsion from the previous permanent magnet and attraction to the subsequent permanent magnet. When the axes of electromagnet and permanent magnet coincide, the electromagnet is not connected to the dc current source because the brush passes over an insulating spacer between conducting plates. This position is traversed by inertia. Advantages of the proposed motor are provided by a certain strictly determines ratio of the numbers of electromagnets and permanent magnets, their mutual arrangement, and the scheme of commutation.

Figure 2:
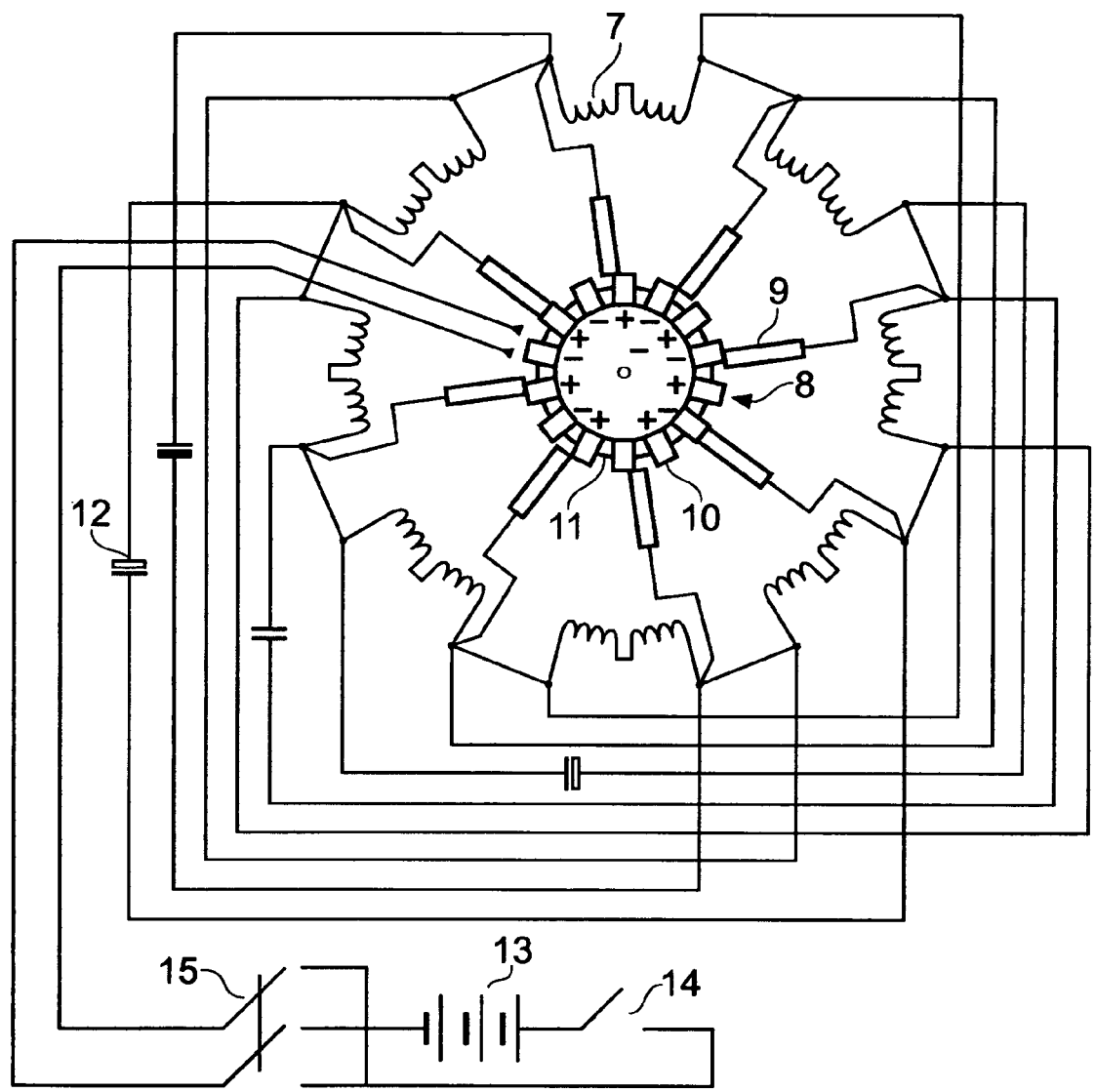
FIG. 2 shows a diagram of connections for a reversible motor according to the present invention.

FIG. 2 shows the typical electric wiring diagram of a motor according to the present invention. Here, the number of the permanent magnets in the stator (n=14) and the number of electromagnets in the rotor (m=6) are also selected so as to obey the relations $n=10+4k$, $m=4+2l$, where k=l=1.

The terminals of coils of the opposite electromagnets (6) connected to the brushes (8) are shunted by capacitors (11) so as to form resonance circuits. This shunting additionally improves dynamic characteristics of the motor and practically eliminates sparking at the collector brushes. The capacitance of these shunting capacitors is increased in proportion to the number of turns in the coils. The total number of turns in coils of the opposite electromagnets may be different. In order to increase the resonance phenomena, it is necessary to provide that this difference would amount to $1/2^p$ of the total number of turns in a coil (where p=2, 3, 4, . . . ). For example, if the total number of turns in the coils of one electromagnet is 128 and p=5, the total number of turns in coils of the opposite electromagnet is 124; for p=4, the total number of turns in coils of the opposite electromagnet is 120, and so on.

The collector distributor (8) is connected to a dc current source (13) via a common switch (14). The scheme may also include an additional switch (15) alternating the polarity of voltage applied to the collector distributor. This switch changes the direction of motor rotation from direct to reverse. In addition, the scheme may involve additional units (not depicted in FIG. 2) providing stabilization and control over the electric current. For example, start-up and acceleration regimes can be facilitated by using a highly reliable chemotronic accumulator providing a high-power pulse discharge.

Figure 3:
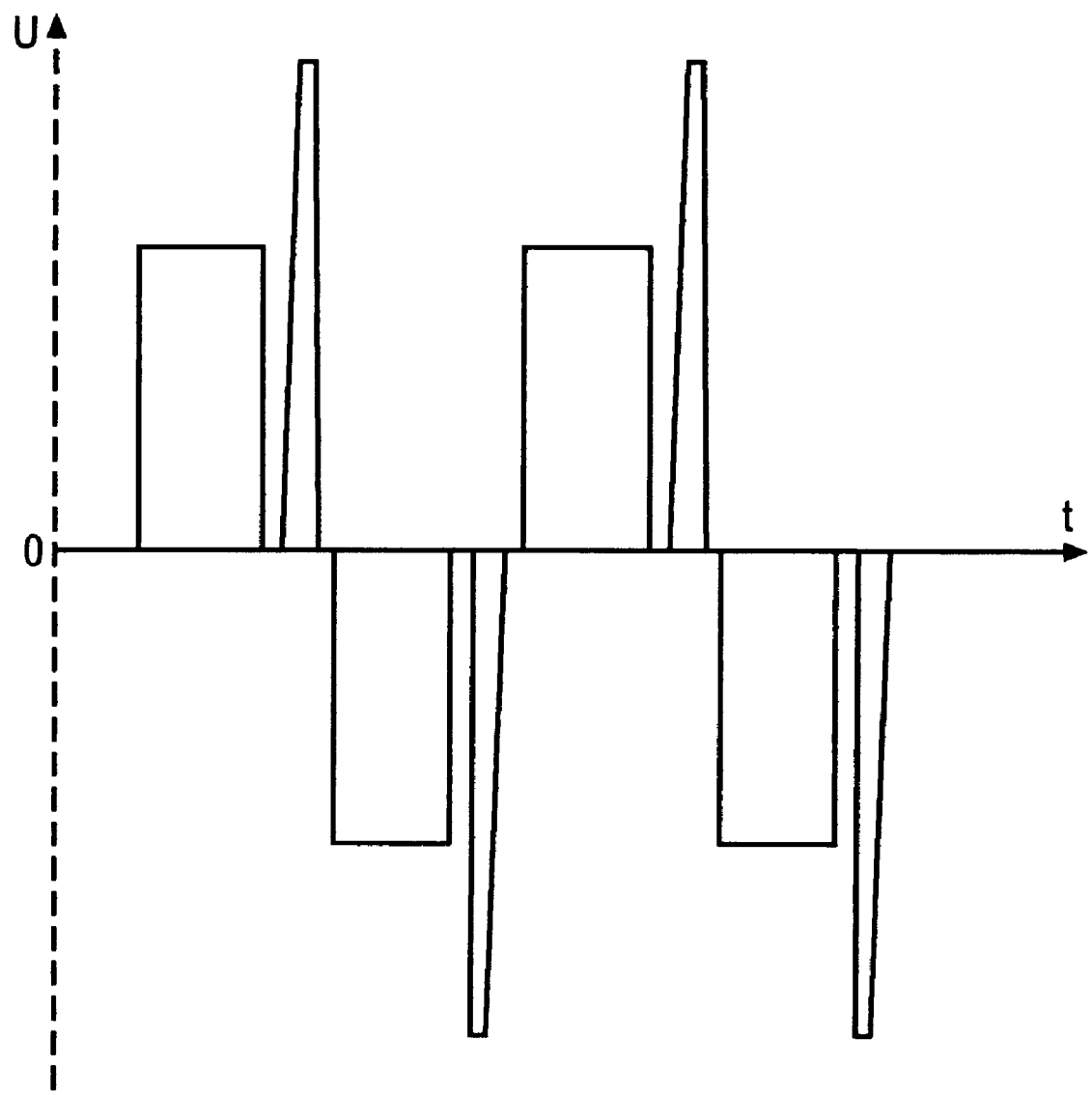
FIG. 3 gives the typical time series of voltage pulses arising in a resonance circuit during operation of a motor according to the present invention.

FIG. 3 presents the typical time series of voltage pulses arising in a resonance circuit formed by electromagnet coils and the corresponding shunting capacitor. A change in the polarity of connection of each circuit in the course of rotation creates alternating current in the circuits. A torque developed by the motor is enhanced due to a resonance increase in this current.

Figure 4:
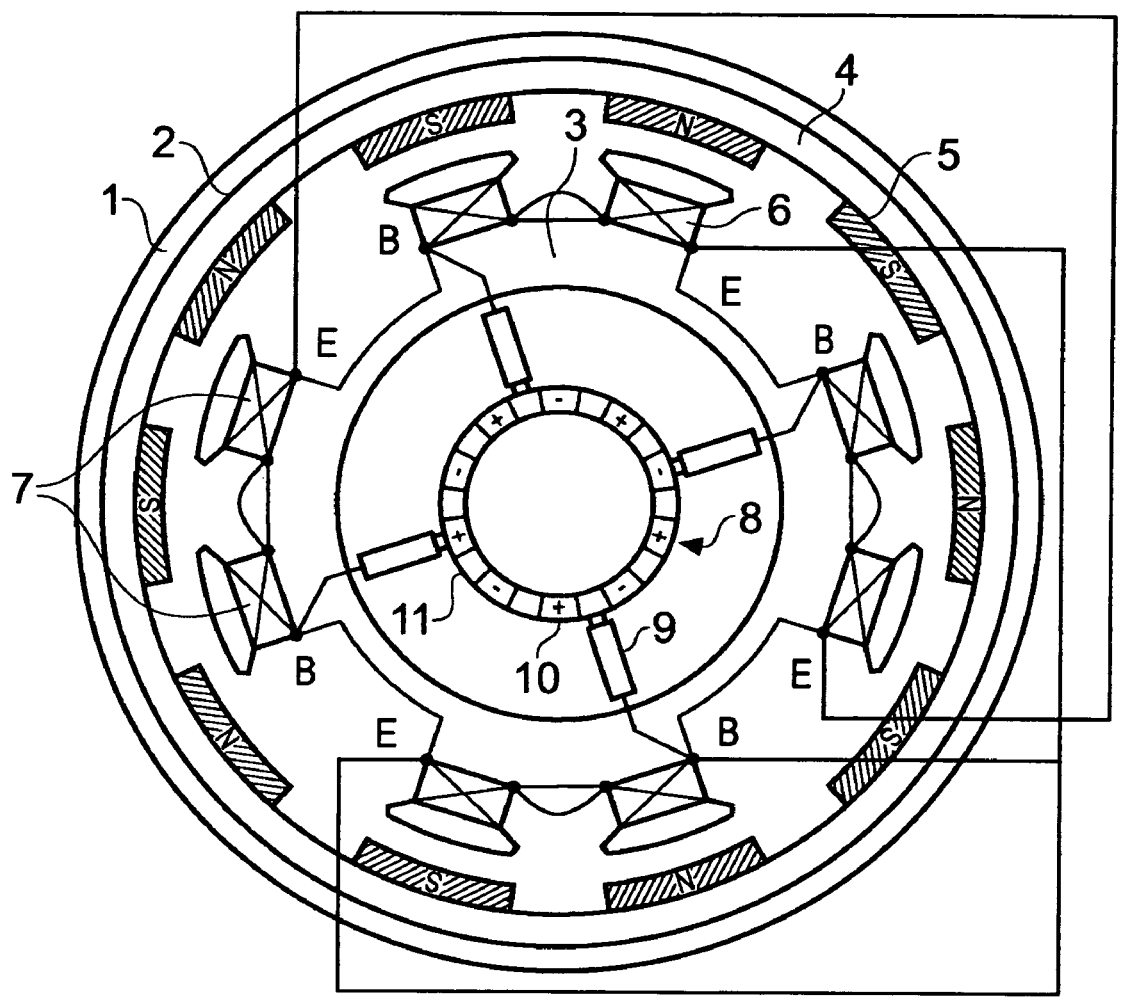
FIG. 4 gives a schematic diagram of the motor according to the present invention, in which the rotor is arranged inside the stator.

FIG. 4 shows a schematic diagram of the motor according to the present invention, in which the stator (2) is arranged outside the rotor (3). This variant can be used, for example, in electric elevators, generators, etc. Otherwise, the design and principle of operation of this motor are analogous to those described above.

EXAMPLES

Electric motors according to the present invention show evidence for reliable design and exhibit high performance characteristics.

Example 1

A prototype electric motor was constructed with a stator involving 22 permanent magnets, a rotor involving three pairs of electromagnets, and the coils in each electromagnet containing 68 turns of an 1.06-diam wire. The motor has the following parameters: diameter, 300 mm; width 50 mm; weight, 7.5 kg; power consumption, 240 W; supply voltage, 24 V; torque, 9.6 N/m.

This motor was used as a motor-wheel in a bicycle of the STELS type with 26" wheels. The current source comprised a pair of 12-V storage batteries, each with a capacity of 20 A/h. The bicycle with an electric drive based on the proposed motor was tested to show the following characteristics: weight-carrying capacity, 120 kg; cruising speed, 25 km/h; maximum run (for a storage battery discharged to 10.5 V), 40 km.

Example 2

A prototype electric motor was constructed with a stator involving 22 permanent magnets, a rotor involving five pairs of electromagnets, and the coils in each electromagnet containing 50 turns of an 1.25-diam wire. The motor has the following parameters: diameter, 300 mm; width 60 mm; weight, 9.6 kg; power consumption, 1000 W; supply voltage, 48 V; torque, 40 N/m.

This motor was used as a motor-wheel in a scooter type with 16" motorcycle wheels. The current source comprised four 12-V storage batteries, each with a capacity of 20 A/h. The scoter with an electric drive based on the proposed motor was tested to show the following characteristics: weight-carrying capacity, 150 kg; cruising speed, 45 km/h; maximum speed, 60 km/h; maximum run (for a storage battery discharged to 10.5 V), 50 km.

Example 3

A prototype electric motor was constructed with a stator involving 18 permanent magnets, a rotor involving four pairs of electromagnets, and the coils in each electromagnet containing 55 turns of an 1.32-diam wire. The motor has the following parameters: diameter, 306 mm; width 72 mm; weight, 11 kg; power consumption, 1500 W; supply voltage, 48 V; torque, 52 N/m.

Two such motors were used as motor-wheels in a three-wheel carriage with 16" motorcycle wheels for a driver and two passengers. The current source comprised four 12-V storage batteries, each with a capacity of 60 A/h. The carriage with an electric drive based on the proposed motor was tested to show the following characteristics: weight-carrying capacity, 500 kg; cruising speed, 45 km/h; maximum speed, 70 km/h; maximum run (for a storage battery discharged to 10.5 V), 70 km.

All measurements disclosed herein are at standard temperature and pressure, at sea level on Earth, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A pulsed inertial electric motor, comprising:
   (i) a stator with circular magnetic conductor on which an even number of permanent magnets are uniformly arranged with a certain pitch,
   (ii) a rotor separated from the stator by air gap and bearing an even number of electromagnets, each electromagnet consisting of two coils with opposite winding directions, which are connected in series,
   (iii) a collector distributor mounted on the stator body, containing circularly arranged current-conducting plates separated by insulating spacers and connected with alternating polarity to a dc current source, and
   (iv) current collectors-brushes mounted on the rotor and capable of contacting with plates of the collector distributor, whereby all brushes are connected to identical terminals of the windings of said electromagnets arranged in pairs, one opposite to another, and interconnected so that the coils of adjacent electromagnets are connected in series, the coils in the opposite electromagnets are connected to each other via one identical terminal and to the opposite brushes via another identical terminal, with the number n of permanent magnets in the stator obeying the relation $n=10+4k$, where k is an arbitrary integer (k=0, 1, 2, 3, . . . ).

2. The electric motor according to claim 1, wherein the number m of electromagnets in the rotor obeys the relation $m=4+2l$, where l is any integer such that $0 \leq l \leq k$.

3. The electric motor according to claim 1, wherein the number of current-conducting plates in the collector distributor is equal to the number of permanent magnets in the stator.

4. The electric motor according to claim 1, wherein the axial lines of the insulating spacers of the collector distributor are oriented along the axial lines of permanent magnets of the stator.

5. The electric motor according to claim 1, wherein the total numbers of turns in coils of the opposite electromagnets are different and this difference amounts to $1/2^p$ of the total number of turns in one of the coils, where p=2, 3, 4, . . . , and so on.

6. The electric motor according to claim 1, wherein the positive current-conducting plates of the collector distributor are connected to the positive electrode of the power supply source, while the negative current-carrying plates are shorted to the motor frame.

7. The electric motor according to claim 1, wherein the positive plates of the collector distributor are connected to the positive electrode of the dc current source, while the negative plates of the collector distributor are connected to the negative electrode of the dc current collector distributor are connected to the negative electrode of the power supply source and isolated from the motor case.

8. The electric motor according to claim 1, wherein a phase lead in the contact between brushes and current-conducting collector plates falls within 0-8°.

9. The electric motor according to claim 1, wherein the rotor is arranges outside the stator.

10. The electric motor according to claim 1, wherein the rotor is arranges inside the stator.

11. The electric motor according to any claim 1, wherein the coils of the opposite electromagnets connected to the brushes are shunted by capacitors so as to form resonance circuits.

12. The electric motor according to claim 11, wherein the capacitance of said capacitors shunting the coils of electromagnets is increased in proportion to the number of turns in the coils of electromagnets.

13. The electric motor according to claim 11, wherein all resonance circuits formed by said capacitors and coils would have the same resonance frequency.

* * * * *